United States Patent

Yung et al.

[11] Patent Number: 5,497,145
[45] Date of Patent: Mar. 5, 1996

[54] SELECTIVE CALL RECEIVER WITH BATTERY SAVING FEATURES AND METHOD THEREFOR

[75] Inventors: Weng F. Yung; Dee N. Ong, both of Singapore, Singapore

[73] Assignee: Motorola, Inc., Schaumburg, Ill.

[21] Appl. No.: 270,977

[22] Filed: Jul. 5, 1994

[51] Int. Cl.$^6$ ............... G08B 5/22; H04L 7/00; H04B 7/00
[52] U.S. Cl. ............... 340/825.44; 340/825.21; 455/38.3
[58] Field of Search ............... 340/825.44, 825.2, 340/825.21; 370/84; 455/229, 38.3, 343

[56] References Cited

U.S. PATENT DOCUMENTS

| | | | |
|---|---|---|---|
| 4,663,623 | 5/1987 | Lax et al. | 340/825.44 |
| 4,756,010 | 7/1988 | Nelson et al. | 340/825.21 |
| 4,802,240 | 1/1989 | Yamaguchi et al. | 340/825.44 |
| 4,839,639 | 6/1989 | Sato et al. | 340/825.44 |
| 4,961,073 | 10/1990 | Drapac et al. | 340/825.44 |
| 5,010,330 | 4/1991 | Snowden et al. | 340/825.21 |
| 5,032,835 | 7/1991 | DeLuca | 340/825.44 |
| 5,049,875 | 9/1991 | DeLuca et al. | 340/825.44 |
| 5,150,954 | 9/1992 | Hoff | 340/825.44 |
| 5,296,849 | 3/1994 | Ide | 340/825.44 |

*Primary Examiner*—Donald J. Yusko
*Assistant Examiner*—Edward Merz
*Attorney, Agent, or Firm*—Philip P. Macnak

[57] ABSTRACT

A method for battery saving in a selective call receiver (20) that comprises a baud rate detector (210) and a receiver circuit (202) for receiving and demodulating a selective call signal. The selective call signal comprises a preamble (102) and a plurality of data batches. Each of the plurality of data batches further comprises a synchronization codeword (104) and a plurality of assigned data frames (106). The method (30) begins when a predetermined baud rate is detected in each of the plurality of assigned data frames (106) in one of the plurality of data batches. Upon detecting the predetermined baud rate, the selective call receiver (20) inactivates the receiver circuit (202) for the duration of the synchronization codeword (104) in a subsequent one of the plurality of data batches. Otherwise, the receiver circuit (202) remains activated during the synchronization codeword (104) of the subsequent one of the plurality of data batches.

16 Claims, 3 Drawing Sheets

5,497,145

SELECTIVE CALL RECEIVER WITH BATTERY SAVING FEATURES AND METHOD THEREFOR

FIELD OF THE INVENTION

This invention relates in general to selective call receivers and in particular to a method and apparatus for battery saving in a selective call receiver.

BACKGROUND OF THE INVENTION

Selective call receivers known in the art are typically battery powered to allow for portability and convenience. As batteries have a limited energy content, reducing the current consumption of a selective call receiver helps to increase an operating duration of the selective call receiver.

One method of reducing the current consumption of the selective call receiver is to turn off its receiver circuitry when there are no radio signals intended for it. A substantial savings in current is obtained because the receiver circuitry consumes a large portion of the current supplied to the selective call receiver. Typically, the method skips over portions of a selective call signal and thereby saves current during specific time intervals of inactivity when the receiver circuitry is turned off. One prior art method which skips over the POCSAG synchronization codeword is adopted in U.S. Pat. Nos. 4,663,623 and 4,802,240 assigned.

However, the prior art methods to save current consumption by skipping over the synchronization codewords are unreliable because in skipping over the synchronization codewords, the selective call receiver may lose synchronization in decoding later portions of the selective call signal. A loss of synchronization results in errors when decoding the selective call signal or loss of the selective call signal completely. Furthermore, when the prior art method fails, the receiver will turn on for a longer period of time in an attempt to correct the failure and, thereby, cause an adverse increase in current consumption.

Thus, what is needed is a method to reduce current consumption in selective call receivers and yet maintain reliability in signal decoding.

SUMMARY OF THE INVENTION

In carrying out the objects of the present invention in one form, there is provided a method for battery saving in a selective call receiver when receiving a selective call signal having a preamble and a plurality of data batches. Each of the plurality of data batches includes a plurality of assigned data frames. The selective call receiver includes a baud rate detector and a receiver circuit for receiving and demodulating the selective call signal.

The method comprises a step of detecting a predetermined baud rate during reception of each of the plurality of assigned data frames in one of the plurality of data batches. When the predetermined baud rate was so detected, the method comprises a next step of inactivating the receiver circuit during a synchronization codeword in a subsequent one of the plurality of data batches.

DETAILED DESCRIPTION OF THE INVENTION

Figure 1:
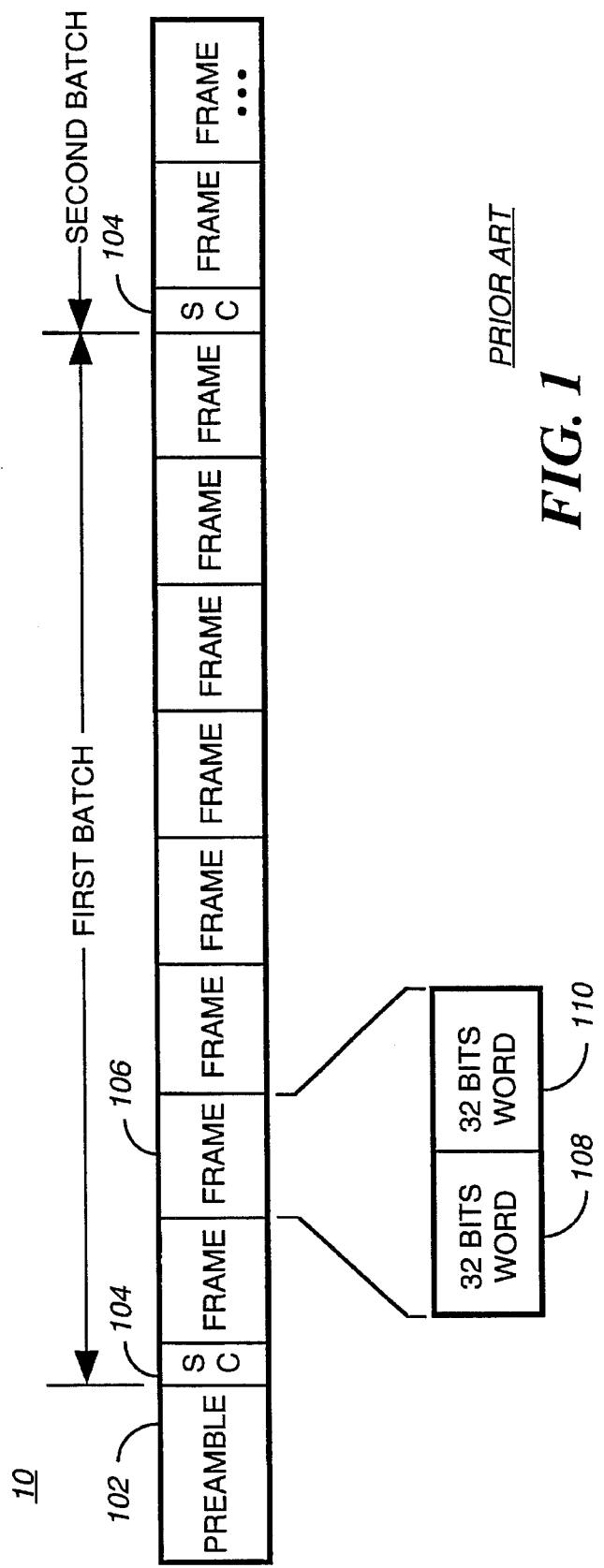
FIG. 1 is a signaling diagram of a prior art POCSAG protocol signal.

Referring now to FIG. 1, a signaling diagram according to the British Postal Office Code and Standardization Advisory Group (POCSAG) is shown. In a selective call signal that uses a POCSAG signal format 10, a preamble 102 precedes a plurality of data batches. Each data batch of the plurality of data batches in the POCSAG signal format 10 comprises a synchronization codeword 104 and eight data frames. A data frame 106 further comprises two thirty-two bit data word 108, 110. The preamble 102 and the synchronization codeword 104 allows a selective call receiver to bit synchronize with the selective call signal. Prior to receiving the selective call signal, the selective call receiver typically operates in an asynchronous battery saving mode. As is known in the art for POCSAG signaling, a plurality of assigned data frames from the eight data frames is allocated to the selective call receiver.

Figure 2:
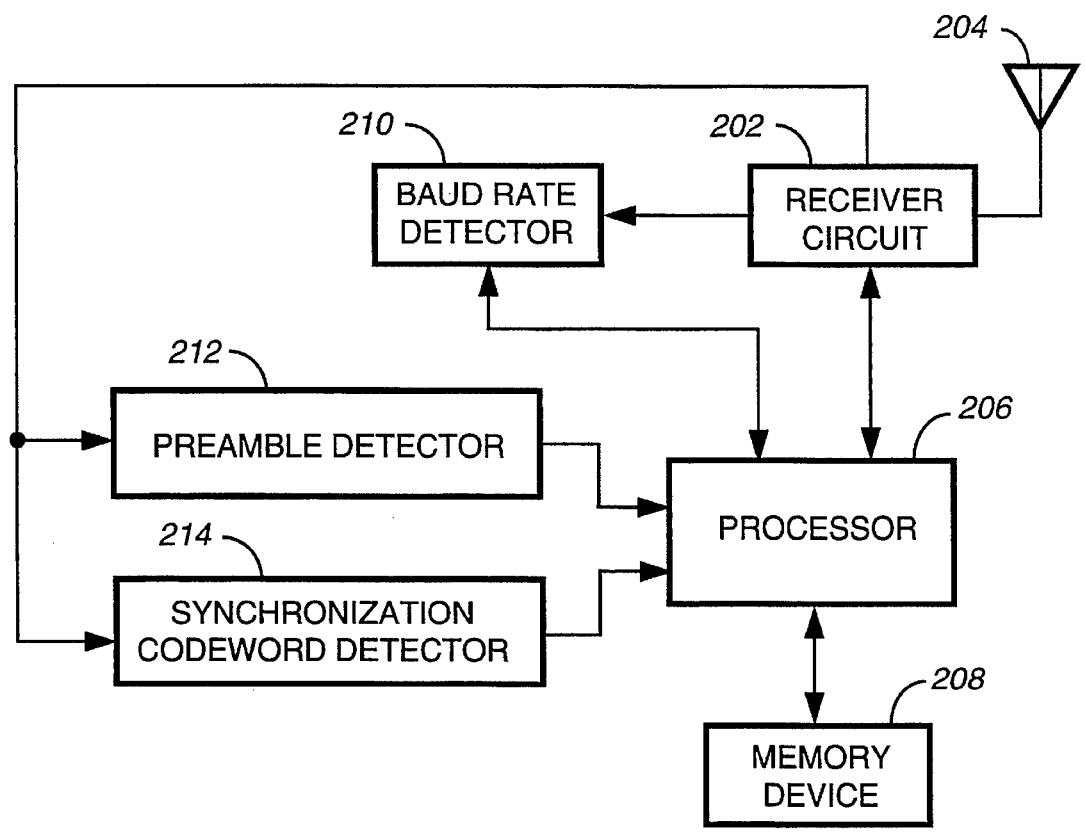
FIG. 2 is a block diagram of a selective call receiver in accordance with an embodiment of the present invention.

In accordance with a preferred embodiment of the present invention, FIG. 2 shows a block diagram of a selective call receiver 20. The selective call receiver 20 comprises a receiver circuit 202 block coupled to an antenna 204 and a processor 206. The processor 206 further couples to a baud rate detector 210, a preamble detector 212, and a synchronization codeword detector 214. Typically, the processor 206 will access a memory device 208, such as a codeplug, for a plurality of predetermined selective call signal parameters that include a predetermined baud rate used by the selective call receiver for the selective call signal and information identifying the plurality of assigned data frames allocated to the selective call receiver.

Figure 3:
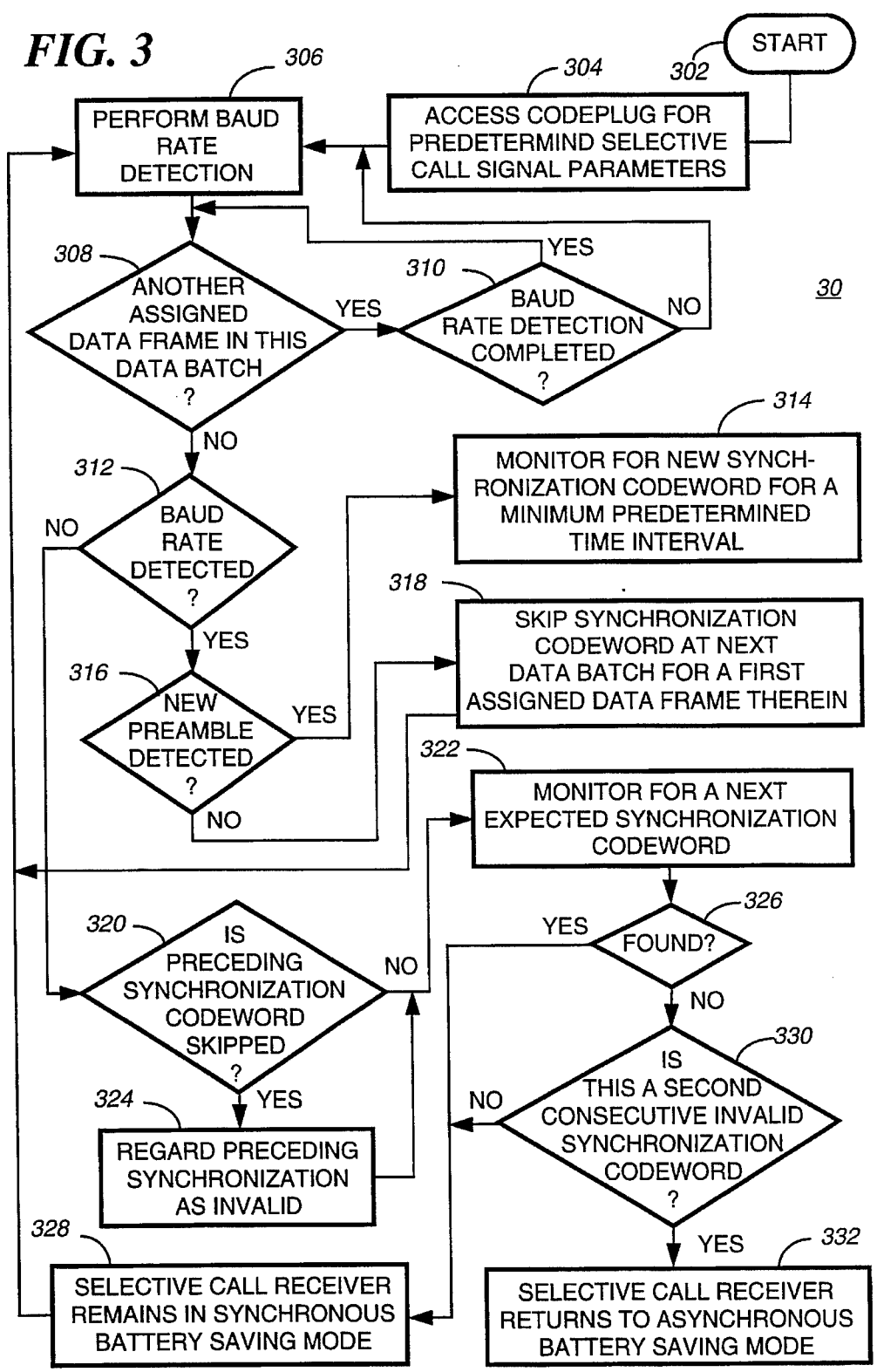
FIG. 3 is a flow chart of the operation of the selective call receiver processor of FIG. 2 in accordance with an embodiment of the present invention.

A method 30 for battery saving in the selective call receiver 20 is shown in FIG. 3 in accordance with a preferred embodiment of the present invention. The method begins at step 302 after having earlier identified from a preamble that the selective call signal is intended for the selective call receiver 20. A next step in the method 30 occurs when the processor 206 accesses a codeplug 304 for the plurality of predetermined selective call signal parameters. The selective call receiver 20 then performs a baud rate detection 306 at each of the plurality of assigned data frames in one of the plurality of data batches. The baud rate detection is repeated until all the plurality of assigned data frames in the one of the plurality of data batches is completed. Otherwise, the method 30 loops back at step 310 to continue the baud detection at step 306.

When the baud rate detection is completed for the plurality of assigned data frames in the one of the plurality of data batches, the processor confirms the baud rate detection 312 and the selective call receiver 20 proceeds to check whether a new preamble for another selective call signal is detected 316. Checking for the new preamble prevents the selective call receiver 20 from incorrectly identifying the new preamble as the assigned data frame because the new preamble has a same predetermined baud rate as the each of the plurality of assigned data frames.

When the new preamble is detected, the selective call receiver 20 then returns to an asynchronous battery saving mode to monitor for a new synchronization codeword for a minimum predetermined time interval 314. As the preamble for the POCSAG signal format has a duration of five hundred and seventy-six bits, the minimum predetermined time interval is set at five hundred and seventy-six bits.

When the new preamble is not detected, the processor 206 inactivates the receiver circuit 202 for the duration of a synchronization codeword 104 in a next one of the plurality of data batches. In other words, the receiver circuit 202 skips the detection of a synchronization codeword at a next occurrence to go to a next data batch for a first assigned data frame therein 318. Hence, the selective call receiver 20 saves on the receiver circuit 202 current during the synchronization codeword 104. Herein, the next data batch for the selective call signal is a subsequent one of the plurality of data batches.

By repeating the steps 308, 312, 316, and 318, the processor 206 applies the method 30 to each of the plurality of assigned data frames in a data batch. When determined that the synchronization codeword 104 can be skipped, the processor will then perform the baud rate detection 306 for a subsequent data batch at a first assigned frame therein.

The novelty in this method 30 for battery saving in the selective call receiver 20 lies in applying the baud rate detector to perform synchronization at the plurality of assigned data frames. Prior art methods may save on current by skipping over synchronization codewords, but synchronization in the prior art methods can be lost because a baud rate detection was not performed during reception of the each of the plurality of assigned data frames.

When the baud rate was not detected in the method 30 at step 312, the processor 206 then checks at step 320 whether a preceding synchronization codeword was skipped. Herein, the preceding synchronization codeword refers to the synchronization codeword 104 of a preceding data batch. When the preceding synchronization codeword was not skipped, the processor 206 continues to monitor for a next expected synchronization codeword 322. When the next expected synchronization codeword is found at step 326, the selective call receiver 20 remains in a synchronous battery saving mode 328. Otherwise, when the next expected synchronization codeword is not found, the selective call receiver 20 then checks to determine whether this is a second consecutive invalid synchronization codeword 330. As the preceding synchronization codeword was not skipped for this case, the selective call receiver 20 remains in the synchronous battery saving mode because this next synchronization codeword 104 that was not found at step 326 is a first invalid synchronization codeword 104. This will allow the selective call receiver 20 to activate the receiver circuit at the next synchronization codeword 104 to regain bit synchronization for processing the plurality of assigned data frames in a next data batch of the selective call signal.

In a case where the preceding synchronization codeword was skipped at step 320, the processor 206 will regard the preceding synchronization codeword as invalid 324. The method 30 then continues to steps 322 and 326. At step 326, when the next expected synchronization codeword is found, the selective call receiver 20 remains in the synchronous battery saving mode and the processor 206 will then have a first invalidated synchronization codeword. Otherwise, when the next expected synchronization codeword is not found, the selective call receiver will then have encountered two invalid synchronization codeword at step 330. The first invalid synchronization codeword was at step 324 and the second invalid synchronization codeword was at step 330. Following this, the processor 206 will then switch the selective call receiver 20 to an asynchronous battery saving mode 332.

By now it should be appreciated that there has been provided a novel method for battery saving in the selective call receiver 20 wherein the processor 206 has reliably determined that synchronization is possible using the baud rate detector 210 to synchronize the selective call receiver 20 at the plurality of assigned data frames. This method 30 results in battery saving by not having to activate the receiver circuit 202 during the synchronization codeword 104 of the selective call signal.

We claim:

1. A method for battery saving in a selective call receiver having a baud rate detector and a receiver circuit, wherein the receiver circuit receives and demodulates a selective call signal, and wherein the selective call signal includes a preamble and a plurality of data batches, and further wherein each of the plurality of data batches comprises a synchronization codeword and a plurality of assigned data frames, the method comprising the steps of:

performing baud rate detection by the baud rate detector during reception of at least one of the plurality of assigned data frames; and determining whether to activate the receiver circuit during a synchronization codeword of a subsequent one of the plurality of data batches in response to the baud rate detection by determining to activate the receiver circuit during the synchronization codeword of the subsequent one of the plurality of data batches when the baud rate is not detected in the at least one of the plurality of assigned data frames or determining to not activate the receiver circuit during the synchronization codeword of the subsequent one of the plurality of data batches when the baud rate is detected in the at least one of the plurality of assigned data frames.

2. The method of claim 1 wherein the step of performing the baud rate detection includes the step of accessing, by a processor, a codeplug storing a plurality of predetermined selective call signal parameters for the selective call receiver.

3. The method of claim 2 wherein the plurality of predetermined selective call signal parameters includes a predetermined baud rate for the selective call signal.

4. The method of claim 3 wherein the plurality of predetermined selective call signal parameters further includes information identifying a plurality of assigned data frames allocated to the selective call receiver.

5. The method of claim 1 wherein the step of determining includes the step of determining to activate the receiver circuit during a next expected synchronization codeword when the receiver circuit was not activated during a synchronization codeword in the subsequent one of the plurality of data batches and the baud rate is not detected in the at least one of the plurality of assigned data frames.

6. The method of claim 5 further including the step of switching operation to an asynchronous battery saving mode when the next expected synchronization codeword is not found.

7. The method of claim 5 further including the step of continuing operation in a synchronous battery saving mode when the next expected synchronization codeword is found.

8. The method of claim 1 wherein the step of determining includes the step of determining to switch operation to an asynchronous battery savings mode when the receiver circuit was activated during a synchronization codeword in the subsequent one of the plurality of data batches and the baud rate is not detected in the at least one of the plurality of assigned data frames.

9. The method of claim 1 further comprising the steps of:

determining whether a POCSAG preamble is detected in response to the baud rate being detected in the at least one of the plurality of assigned data frames; and activating the receiver circuit to monitor for a new synchronization codeword in response to the POCSAG preamble being detected.

10. A method for battery saving in a selective call receiver during reception of a selective call signal having a preamble and a plurality of data batches, and wherein each of the plurality of data batches includes a plurality of assigned data frames, and wherein the selective call receiver includes a baud rate detector and a receiver circuit, wherein the receiver circuit receives and demodulates the selective call signal, the method comprising the steps of:

determining whether a predetermined baud rate is detected during reception of each of the plurality of assigned data frames in one of the plurality of data batches;

inactivating the receiver circuit during a synchronization codeword in a subsequent one of the plurality of data batches in response to the predetermined baud rate being detected; and activating the receiver circuit during a synchronization codeword in a subsequent one of the plurality of data batches in response to the predetermined baud rate not being detected.

11. The method of claim 10 further including the step of accessing a memory device storing a plurality of predetermined selective call signal parameters including the predetermined baud rate and information identifying the plurality of assigned data frames.

12. The method of claim 10 wherein the step of activating the receiver circuit comprises the step of activating the receiver circuit for a next expected synchronization codeword after the synchronization codeword in the subsequent one of the plurality of data batches in response to the receiver circuit being activated during the synchronization codeword in the subsequent one of the plurality of data batches and the predetermined baud rate being not detected.

13. The method of claim 12 further including the step of continuing operation in a synchronous battery saving mode in response to the next expected synchronization codeword being detected.

14. The method of claim 12 further including the step of switching operation to an asynchronous battery saving mode in response to the next expected synchronization codeword not being detected.

15. A selective call receiver for receiving a selective call signal at a predetermined baud rate, wherein the selective call signal includes a preamble and a plurality of data batches, and wherein each of the plurality of data batches includes a synchronization codeword and at least one assigned data frame, the selective call receiver comprising:

a receiver circuit for receiving and demodulating the selective call signal;

a baud rate detector coupled to the receiver circuit for detecting the predetermined baud rate of the selective call signal;

a synchronization codeword detector coupled to the receiver circuit for detecting synchronization codewords within the plurality of data batches; and a processor coupled to the receiver circuit and the baud rate detector for inactivating the receiver circuit and the synchronization codeword detector during reception of a synchronization codeword in one of the plurality of data batches in response to detecting the predetermined baud rate in the at least one assigned data frame of an immediately preceding one of the plurality of data batches and for activating the receiver circuit and the synchronization codeword detector during reception of a synchronization codeword in one of the plurality of data batches in response to not detecting the predetermined baud rate in the at least one assigned data frame of an immediately preceding one of the plurality of data batches.

16. The selective call receiver of claim 15 further comprising a preamble detector coupled to the receiver circuit for detecting the preamble, wherein the processor activates the preamble detector in response to detecting the predetermined baud rate in the at least one assigned data frame.

* * * * *